United States Patent
Knott et al.

(10) Patent No.: US 7,645,848 B2
(45) Date of Patent: Jan. 12, 2010

(54) PROCESS FOR PREPARATION OF SIOC-LINKED, LINEAR POLYDIMETHYLSILOXANE-POLYOXYALKYLENE BLOCK COPOLYMERS

(75) Inventors: Wilfried Knott, Essen (DE); Ruediger Landers, Essen (DE); Dagmar Windbiel, Essen (DE)

(73) Assignee: Goldschmidt GmbH, Essen (DE)

( * ) Notice: Subject to any disclaimer, the term of this patent is extended or adjusted under 35 U.S.C. 154(b) by 362 days.

(21) Appl. No.: 11/465,845

(22) Filed: Aug. 21, 2006

(65) Prior Publication Data
US 2007/0049717 A1  Mar. 1, 2007

(30) Foreign Application Priority Data
Aug. 24, 2005  (DE) .................. 10 2005 039 931

(51) Int. Cl.
*C08G 77/46* (2006.01)
(52) U.S. Cl. ................... 528/21; 528/29; 528/38

(58) Field of Classification Search .............. None
See application file for complete search history.

(56) References Cited

U.S. PATENT DOCUMENTS

| | | | | |
|---|---|---|---|---|
| 3,318,844 A | * | 5/1967 | Krantz .................. | 525/478 |
| 3,629,310 A | * | 12/1971 | Bailey et al. .............. | 556/444 |
| 3,836,560 A | | 9/1974 | Prokai et al. | |
| 3,947,386 A | | 3/1976 | Prokai et al. | |
| 4,242,252 A | * | 12/1980 | Newing .................. | 524/718 |

* cited by examiner

*Primary Examiner*—Marc S Zimmer
(74) *Attorney, Agent, or Firm*—Frommer Lawrence & Haug LLP

(57) ABSTRACT

The invention therefore relates to a process for preparation of SiOC-linked, linear $(AB)_d$ polydimethylsiloxane-polyoxyalkylene block copolymers of the general formula $[(R_2SiO)_x(C_nH_{2n}O)_y]_d$, in which R are monovalent $C_1$-$C_{18}$, preferably $C_1$-$C_4$, hydrocarbon radicals,
n is a number from 2 to 4, preferably 2 or 3,
$x \geq 5$,
$y \geq 10$,
$d \geq 3$,
via reaction of aminosiloxanes having primary amino groups with polyoxyalkylenediols, which comprises concomitant use of one or more tertiary amines as catalyst.

14 Claims, 1 Drawing Sheet

PROCESS FOR PREPARATION OF SIOC-LINKED, LINEAR POLYDIMETHYLSILOXANE-POLYOXYALKYLENE BLOCK COPOLYMERS

Any foregoing applications, and all documents cited therein or during their prosecution ("application cited documents") and all documents cited or referenced in the application cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention. Citation or identification of any document in this application is not an admission that such document is available as prior art to the present invention.

The invention relates to a process for preparation of SiOC-linked, linear $(AB)_d$ polydimethylsiloxane-polyoxyalkylene block copolymers.

It is an object of the invention to not encompass within the invention any previously known product, process of making the product or method of using the product such that applicant(s) reserve the right and hereby disclose a disclaimer of any previously known product or processes.

It is further noted that the invention does not intend to encompass within the scope of the invention any product, process of making the product or method of using the product, which does not meet the written description and enablement requirements of the USPTO (35 U.S.C. 112, first paragraph) or the EPO (Article 83 of the EPC), such that applicant(s) reserve the right and hereby disclose a disclaimer of any previously product, method of making the product or process of using the product which does not meet this requirement.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

These polyethersiloxanes are valuable surfactant additives for preparation of polyurethane foams. They are high-molecular-weight linear siloxane-polyoxyalkylene block copolymers of $(AB)_d$ type, where d is a whole number, A is a siloxane block, and B is a polyoxyalkylene block.

The siloxane block (A) of the copolymers is a mainly linear siloxane polymer or a chain having siloxane repeat units (—R$_2$SiO—), and this can be represented by the molecular formula (—R$_2$SiO—)$_x$.

The polyoxyalkylene block (B) of the linear block copolymer is a mainly linear oxyalkylene polymer containing the oxyalkylene repeat units (—C$_n$H$_{2n}$O—)$_y$.

The general structural formula of the high-molecular-weight linear hydrolyzable $(AB)_d$ siloxane-polyoxyalkylene block copolymers is $[(R_2SiO)_x(C_nH_{2n}O)_y]_d$, where R is a moiety selected from the group consisting of monovalent $C_1$-$C_{18}$ hydrocarbon radicals and $C_1$-$C_4$ hydrocarbon radicals which can vary within the individual siloxane blocks or else in the individual block units, n is a number selected the ranges consisting of from 2 to 4 and 2 or 3, x is a number selected from the group consisting of $\geq 5 \geq 10$, and $\geq 14$, y is a number selected from the group consisting of $\geq 10 \geq 20$ and $\geq 40$, d is a number selected from the group consisting of $\geq 3$ and $\geq 5$.

The average molar mass of each siloxane block is selected from the group of ranges consisting of from about 350 to 10 000 g/mol, from about 400 to 10 000 g/mol, and from 1000 to 5000 g/mol.

The size of the individual oxyalkylene units or siloxane blocks is not necessarily uniform, but can vary as desired within the stated limits.

The individual polyoxyalkylene units are adducts composed of at least one oxyalkylene monomer. In one embodiment of the invention, the adducts are co-products composed of at least two monomer units, e.g. ethylene oxide and propylene oxide.

In another embodiment of the invention, the polyoxyalkylene blocks are in essence composed of oxyethylene units or oxypropylene units, e.g. of mixed oxyethylene and oxypropylene units having oxyethylene content of from about 30 to 70% by weight and oxypropylene content of from 70 to 30% by weight, based on the total content of oxyalkylene units in the block.

The substituent R and the indices n, x, y, and d must, of course, have been selected in such a way that in each particular block copolymer the appropriate average values are obtained for the siloxane blocks, and polyoxyalkylene blocks, and the copolymer itself.

The siloxane block content in the copolymer is from 20 to 50% by weight, and the content of the polyoxyalkylene blocks is from 80 to 50% by weight, and the number-average molar mass Mn of the block copolymer is selected from the ranges consisting of from at least 10 000 g/mol to about 300 000 g/mol and from 15 000 g/mol to about 50 000 g/mol. Determination of average molar masses here is based on the known methods of GPC analysis.

These compounds, their use for preparation of polyurethane foams, and also a process for their preparation are described in U.S. Pat. No. 3,836,560, the content of which is incorporated herein by way of reference, and which is part of the disclosure content of the present invention.

The hydrolyzable, linear $(AB)_d$ siloxane-polyoxyalkylene block copolymers are prepared by the polycondensation reaction: ≡SiY+HOC≡→≡SiOC≡+HY, where Y can be an amino group, e.g. —NH$_2$, NHZ, and NZ$_2$, where Z can be a monovalent hydrocarbon radical. In one embodiment of the invention, Y can be represented by the dimethylamino radical.

The condensation reaction carried out in high-boiling-point solvents to give SiOC-linked, linear $(AB)_d$ siloxane-polyoxyalkylene block copolymers is disclosed in that specification only on dimethylamino-substituted polydimethylsiloxanes, which, by virtue of the use of dimethylamine as starting material, are expensive when directly compared with the aminosiloxanes which have an NH$_2$ end group and are direct ammonia derivatives.

It is also recommended that the reaction be carried out in the absence of a catalyst. If condensation catalysts are added, e.g. carboxylic acids and/or their fluorinated derivatives, it is essential that they be neutralized or removed after the end of the reaction, because otherwise the products are not stable $(AB)_d$ block copolymers.

If the technical teaching of U.S. Pat. No. 3,836,560 is implemented using NH$_2$-terminated polydimethylsiloxanes in the condensation reaction with polyetherdiols, it becomes clear that this reaction requires a considerable amount of time to reach the desired increase in molecular weight, and that the intended degree of condensation cannot be established reproducibly even after long reaction times. A macroscopic property which can be utilized for molecular weight increase is dynamic viscosity measured directly after the reaction.

Because of this obvious shortcoming, although the aminosiloxanes having $NH_2$ end groups are attractive for cost-related reasons, it is not technically advisable to use them for preparation of high-molecular-weight linear hydrolyzable $(AB)_d$ siloxane-polyoxyalkylene block copolymers of the general structural formula $[(R_2SiO)_x(C_nH_{2n}O)_y]_d$ and of the more specific structural formula $[(CH_3)_2SiO)_x(C_nH_{2n}O)_y]_d$, which according to the teaching of U.S. Pat. No. 3,947,386 serve for production of molded polyurethane foams.

A particularly sensitive and informative evaluation of the degree of linking achieved in the condensation reaction and of the molar mass increase achieved in these $(AB)_d$ copolymers can be provided by the performance test in which the copolymer obtained is introduced as foam stabilizer in polyurethane formulations for production in particular of ether foams or of open-cell rigid foams. An unsatisfactory degree of condensation in the $(AB)_d$ foam stabilizer can be discerned in technically inadequate performance during the foaming process, examples being shrinkage or collapse.

The object to be achieved by the invention consisted in an industrially reproducible process for the economically rational utilization of ammonia-based aminosiloxanes having in essence primary amino groups as starting materials for preparation of linear, SiOC-linked $(AB)_d$ siloxane-polyoxyalkylene block copolymers.

This process is intended to permit, within acceptable reaction times, reproducibly controlled setting of the degree of condensation and therefore of the molecular weight of the linear, SiOC-linked $(AB)_d$ siloxane-polyoxyalkylene block copolymer, and therefore in particular to provide a path to their use as stabilizers in polyurethane ether foams.

Surprisingly, it has now been found that the object of the invention can be achieved by adding at elevated temperatures a very small amount of a tertiary amine, e.g. from the group of the aromatic amines (pyridines, pyrimidines, pyridazine, pyrazine, quinoline, imidazole, etc.) and/or also from the group of the cycloaliphatic amine bases (quinuclidine, diazabicyclo[2.2.2]octane, etc.), and here in particular 1,8-diazabicyclo[5.4.0]undec-7-ene, to the reaction matrix composed of aminosiloxane, of polyoxyalkylenediol and of solvent, and carrying out the polycondensation reaction with liberation of ammonia until the desired molecular weight increase has been reached. The ammonia can be returned indirectly to the process by using it for preparation of the α,ω-dichlosiloxanes from the corresponding α,ω-dichlorosiloxanes.

The amounts usually used of the catalysts are selected from the ranges consisting of from about 0.1 to about 1.0% by weight and from 0.3 to 0.7% by weight, based on the initial charge of aminosiloxane and polyether.

The present invention therefore provides a process for preparation of SiOC-linked, linear $(AB)_d$ polydimethylsiloxane-polyoxyalkylene block copolymers of the general formula $[(R_2SiO)_x(C_nH_{2n}O)_y]_d$, in which R is a moiety selected from the group consisting of monovalent $C_1$-$C_{18}$ hydrocarbon radicals and $C_1$-$C_4$ hydrocarbon radicals which can vary within the individual siloxane blocks or else in the individual block units, n is a number selected the ranges consisting of from 2 to and 2 or 3, x is a number selected from the group consisting of $\geq 5 \geq 10$, and $\geq 14$, y is a number selected from the group consisting of $\geq 10 \geq 20$ and $\geq 40$, d is a number selected from the group consisting of $\geq 3$ and $\geq 5$.

via reaction of aminosiloxanes having primary amino groups with polyoxyalkylenediols, which comprises concomitant use of one or more tertiary amines as catalyst.

The claims characterize other subject matters of the invention.

The hydrolyzable, linear $(AB)_d$ siloxane-polyoxyalkylene block copolymers are prepared by the polycondensation reaction: $\equiv SiNH_2 + HOC\equiv \rightarrow \equiv SiOC\equiv + NH_3$.

The aminosiloxanes $\equiv SiNH_2$ having amino groups can be prepared via reaction of, by way of example, α,ω-dichloropolydimethylsiloxanes Cl—$(R_2SiO$—$)_{x-1}SiR_2$—Cl with ammonia by processes known per se. The polyoxyalkylenediols are products prepared via addition reactions of alkylene oxides, in particular ethylene oxide and/or propylene oxide, onto short-chain dihydric alcohols by processes known per se.

In order to ensure a maximum degree of polycondensation and effectiveness, the amounts used of the reaction partners should be precisely equimolar or as close as possible thereto, in order to obtain the desired polycondensates with maximum molecular weight. In another embodiment of the invention, the amounts used of the bifunctional reaction partners, polysiloxane and polyoxyalkylenediol, are in the purest possible form, but the presence of mono- and/or trifunctional components here can be accepted in small amounts up to about 3% by weight.

Figure 1:
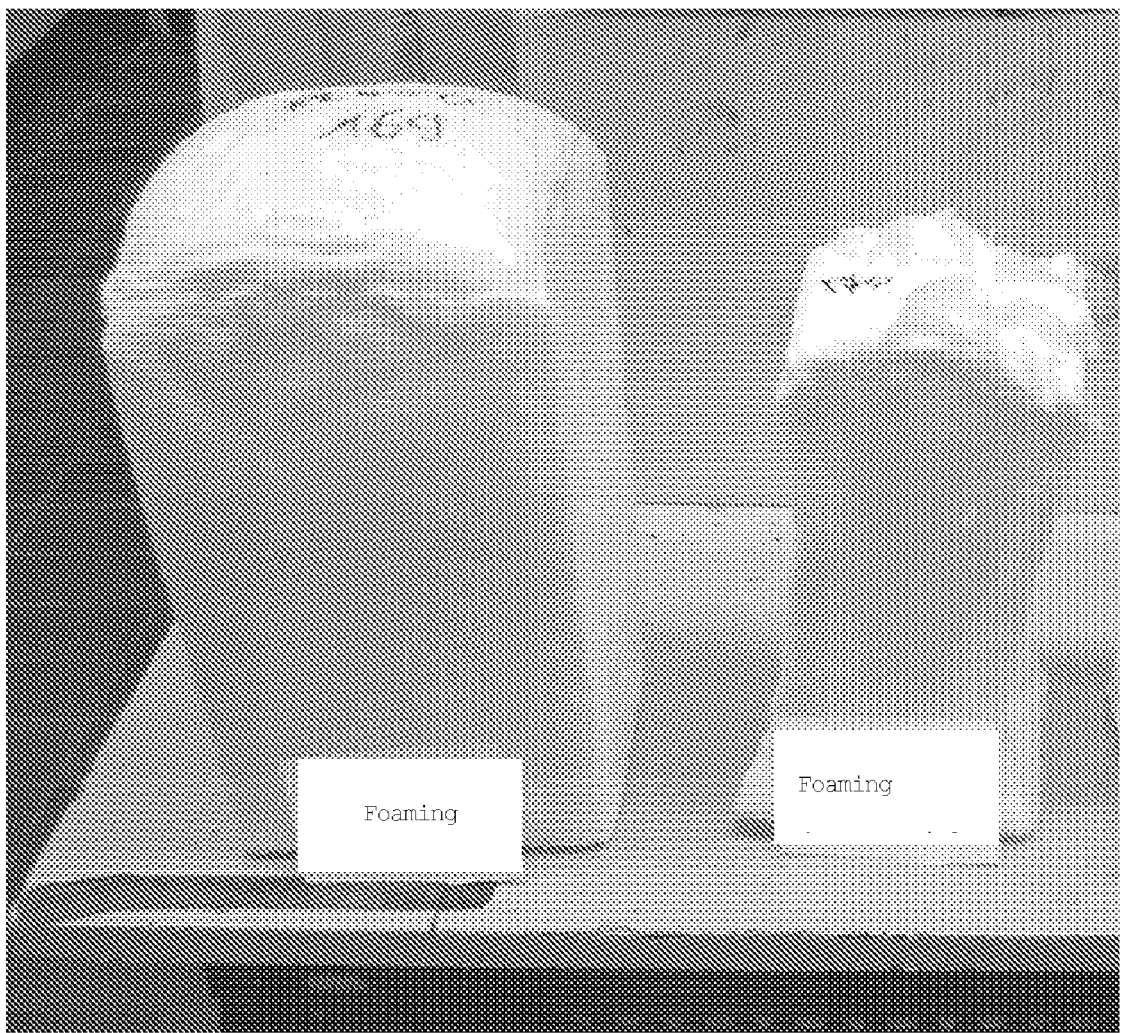
FIG. 1 depicts a comparison of an inventive and non-inventive foam.

The invention is further described by the following non-limiting examples which further illustrate the invention, and are not intended, nor should they be interpreted to, limit the scope of the invention.

PREPARATION EXAMPLES

Example 1

Preparation of an α,ω-diaminosiloxane (Non-Inventive):

An α,ω-dichloropolydimethylsiloxane whose average chain length is 15 is used as initial charge in the form of 25% strength solution in toluene, and $NH_3$ is then introduced at 25° C. over a period of 1.5 h. The precipitated ammonium chloride is removed via filtration, and then toluene is removed by distillation at reduced pressure of about 1 mbar and at bottom temperatures $\leq 60°$ C.

The total nitrogen content of the aminosiloxane is determined analytically and this is used as basis for calculation of molecular weight.

Example 2

(Inventive):

The α,ω-aminosiloxane prepared in Example 1 is used as initial charge in an equimolar ratio with a polyoxyalkylenediol whose average molar mass is 2800 g/mol and with an ethylene oxide/propylene oxide ratio of about 1:1, and reactant concentration is set at 50% by adding, as solvent, a linear alkylbenzene whose boiling range is from about 280 to 320° C. An amount of 0.5 mol % (based on polyether and aminosiloxane used as initial charge) of 1,8-diazabicyclo[5.4.0]undec-7-ene (DBU) is then added, and the mixture is heated to 180° C. A lance is used to pass $N_2$ as stripper gas through the reaction mixture over the entire reaction time of from 6 to 8 hours. The end of the reaction is discernible from a marked rise in viscosity associated with considerable foaming. The dynamic viscosity of the reaction product obtained after 8 hours is about 6000 mPa*s.

Example 3

(Non-Inventive):

By analogy with Example 2, the α,ω-aminosiloxane prepared in Example 1 was used as initial charge in an equimolar ratio with a polyoxyalkylenediol whose average molar mass is 2800 g/mol and with an ethylene oxide/propylene oxide ratio of about 1:1, and reactant concentration is set at 50% by adding, as solvent, a linear alkylbenzene whose boiling range is from about 280 to 320° C. The reaction mixture is heated to 180° C. for from 6 to 8 hours, and a lance is used to pass $N_2$ as stripper gas through the reaction mixture over the entire reaction time of from 6 to 8 hours. After 8 hours, the dynamic viscosity of the reaction product has reached only 851 mPa*s (25° C.).

Foam-stabilization test on the polydimethylsiloxane-polyoxyalkylene block copolymer obtained by the inventive process:

The performance test uses the typical ether foam formulation constituted as follows:

| Parts by weight | Formulation constituents |
|---|---|
| 0.07 | Kosmos ® 29 (stannous 2-ethylhexanoate) from Goldschmidt GmbH |
| 30 | Polyol CP 3322 (commercially available polyol from DOW) |
| 70 | Polyol CP 755 (commercially available polyol from DOW) |
| 7 | Polyol CP 1421 (commercially available polyol from DOW) |
| 1.95 | Water |
| 0.2 | Tegoamin ® BDE (bis(dimethylamino-ethyl)ether solution) from Goldschmidt GmbH |
| 0.3 | Tegoamin ® 33(triethylenediamine solution) |
| 0.2 | Tegoamin ® DMEA (dimethylethanolamine solution) |
| 1.2 | of foam stabilizer to be tested |
| 40.3 | Tolylene diisocyanate (TDI 80) (corresponding to an index of 85). |

Test method for testing of foam stabilizers:

The tin catalyst stannous 2-ethylhexanoate, the three polyols, the water, and the three amine catalysts were used as initial charge in a paper cup and mixed at 1000 rpm for 60 s by a disk agitator. The isocyanate is then added, and is incorporated at 1500 rpm for 7 s by the same agitator. The mixture in the cup begins to foam here. It is therefore poured into a foaming box directly after the end of agitation. This has a basal area of 17×17 cm and a height of 30 cm. External insulation of thickness of 5 cm composed of PU foam prevents excessively rapid cooling. The box is designed with a plastics foil inside, in order to permit subsequent removal of the fully cured foam. The foam rises once the material has been poured into the foaming box. In the ideal case, when the foam has reached its maximum rise height it deflates and then contracts slightly. The cell membrane of the foam bubbles opens here and an open-pore cell structure is obtained in the foam. If stabilizing action is insufficient, the PU foam collapses before maximum rise height has been reached. If there is excessive stabilization, rise of the foam is very prolonged, and it does not deflate. The result is then a very closed cell structure, causing the foam to shrink on subsequent cooling, because as the gas cools its volume contracts.

Results of foaming of reaction products from abovementioned examples:

Observations for Example 2:

The foam rises, deflates after about 2 min, and undergoes no alteration on subsequent cooling. A cell number of 10 cells/cm and a porosity of 70 mm are measured during subsequent investigation (back-pressure measurement, determining the height of a column of water generating an equivalent pressure). This reveals a sufficiently fine and open cell structure (a column of water of about 300 mm being normal for closed foams). The foam has the desired properties of an ether foam. The foam stabilizer of Example 2 is suitable (FIG. 1) for production of this type of foam.

Observation for Example 3:

The foam rises and does not deflate. Instead, the foam continues to rise for a long period (>3 min). The foam shrinks markedly during subsequent cooling. The shrinkage makes it impossible to measure physical properties. The foam stabilizer of this example is unsuitable for production of an ether foam (FIG. 1).

Having thus described in detail various embodiments of the present invention, it is to be understood that the invention defined by the above paragraphs is not to be limited to particular details set forth in the above description as many apparent variations thereof are possible without departing from the spirit or scope of the present invention.

What is claimed is:

1. A process for preparation of SiOC-linked, linear $(AB)_d$ polydimethylsiloxane-polyoxyalkylene block copolymers of the general formula $[(R_2SiO)_x(C_nH_{2n}O)_y]_d$, in which R are monovalent $C_1$-$C_{18}$ hydrocarbon radicals, n is a number from 2 to 4, $x \geq 5$, $y \geq 10$, $d \geq 3$, via reaction of aminosiloxanes having primary amino groups with polyoxyalkylenediols, which comprises concomitant use of one or more tertiary amines as catalyst.

2. The process for preparation of SiOC-linked, linear $(AB)_d$ polydimethylsiloxane-polyoxyalkylene block copolymers as claimed in claim 1, wherein at least one compound selected from the group of the aromatic amines and of the cycloaliphatic amines is used as catalyst.

3. The process for preparation of SiOC-linked, linear $(AB)_d$ polydimethylsiloxane-polyoxyalkylene block copolymers as claimed in claim 2, wherein at least one amine selected from the group of pyridine, pyrimidine, pyridazine, pyrazine, quinoline, imidazole, quinuclidine, diazabicyclo [2.2.2]octane, 1,8-diazabicyclo[5.4.0]undec-7-ene is used as catalyst.

4. The process for preparation of SiOC-linked, linear $(AB)_d$ polydimethylsiloxane-polyoxyalkylene block copolymers as claimed in claim 1, wherein the average molar mass of each siloxane block (—$R_2SiO$—)$_x$, where R=$CH_3$—, is from 500 to 10 000 g/mol.

5. The process for preparation of SiOC-linked, linear $(AB)_d$ polydimethylsiloxane-polyoxyalkylene block copolymers as claimed in claim 1, wherein the average molar mass of each polyoxyalkylene block ($-C_nH_{2n}O-$)$_y$ is from about 600 to 10 000 g/mol.

6. The process for preparation of SiOC-linked, linear (AB)$_d$ polydimethylsiloxane-polyoxyalkylene block copolymers as claimed in claim 1, wherein the average molar mass of the block copolymer is from 10 000 g/mol to about 300 000 g/mol.

7. The process for preparation of SiOC-linked, linear (AB)$_d$ polydimethylsiloxane-polyoxyalkylene block copolymers as claimed in claim 1, wherein the siloxane block content in the copolymer is from 20 to 50% by weight.

8. The process for preparation of SiOC-linked, linear (AB)$_d$ polydimethylsiloxane-polyoxyalkylene block copolymers as claimed in claim 3, wherein the average molar mass of each siloxane block ($-R_2SiO-$)$_x$, where R=CH$_3$—, is from 500 to 10 000 g/mol.

9. The process for preparation of SiOC-linked, linear (AB)$_d$ polydimethylsiloxane-polyoxyalkylene block copolymers as claimed in claim 3, wherein the average molar mass of each polyoxyalkylene block ($-C_nH_{2n}O-$)$_y$ is from about 600 to 10 000 g/mol.

10. The process for preparation of SiOC-linked, linear (AB)$_d$ polydimethylsiloxane-polyoxyalkylene block copolymers as claimed in claim 3, wherein the average molar mass of the block copolymer is from 10 000 g/mol to about 300 000 g/mol.

11. The process for preparation of SiOC-linked, linear (AB)$_d$ polydimethylsiloxane-polyoxyalkylene block copolymers as claimed in claim 3, wherein the siloxane block content in the copolymer is from 20 to 50% by weight.

12. The process for preparation of SiOC-linked, linear (AB)$_d$ polydimethylsiloxane-polyoxyalkylene block copolymers as claimed in claim 8, wherein the siloxane block content in the copolymer is from 20 to 50% by weight.

13. The process for preparation of SiOC-linked, linear (AB)$_d$ polydimethylsiloxane-polyoxyalkylene block copolymers as claimed in claim 9, wherein the siloxane block content in the copolymer is from 20 to 50% by weight.

14. The process for preparation of SiOC-linked, linear (AB)$_d$ polydimethylsiloxane-polyoxyalkylene block copolymers as claimed in claim 10, wherein the siloxane block content in the copolymer is from 20 to 50% by weight.

\* \* \* \* \*

UNITED STATES PATENT AND TRADEMARK OFFICE
CERTIFICATE OF CORRECTION

PATENT NO. : 7,645,848 B2  Page 1 of 1
APPLICATION NO. : 11/465845
DATED : January 12, 2010
INVENTOR(S) : Knott et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 506 days.

Signed and Sealed this

Sixteenth Day of November, 2010

David J. Kappos
*Director of the United States Patent and Trademark Office*